ing the rotation of the clips 1—1 and the pipe 2 about the axis of the bolt 4. It is evident, however, that when it is desired to make a change in the position of the pipe 2, it is only necessary to slacken the nut 5 on the bolt 4, until the hexagonal projection
UNITED STATES PATENT OFFICE.

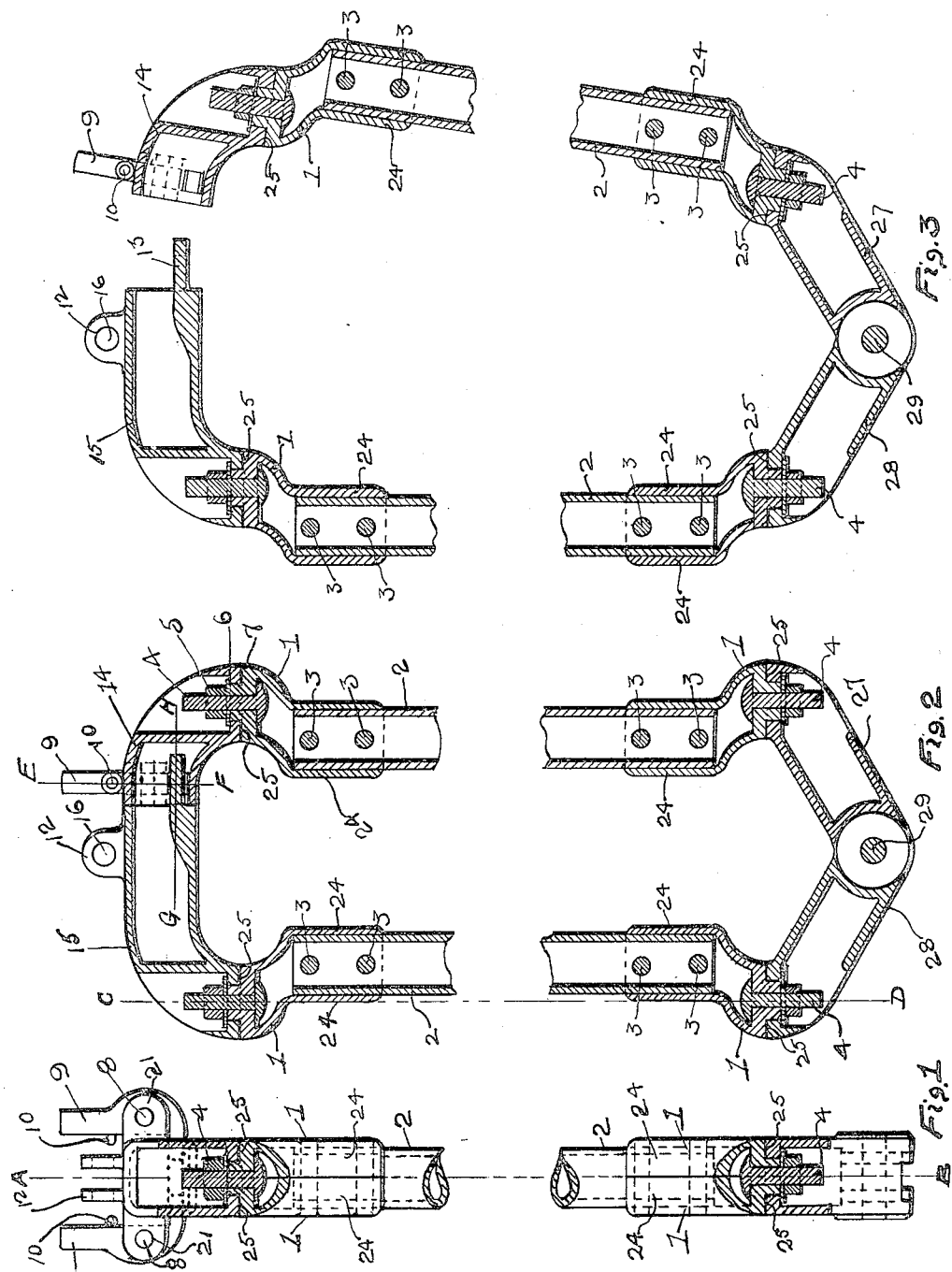

ROSWELL H. BUCKINGHAM, OF EAST MOLINE, ILLINOIS, ASSIGNOR TO J. E. PORTER COMPANY, OF OTTAWA, ILLINOIS, A CORPORATION OF ILLINOIS.

CATTLE-STANCHION.

1,134,255.  Specification of Letters Patent.  Patented Apr. 6, 1915.

Application filed June 8, 1914. Serial No. 843,791.

*To all whom it may concern:*

Be it known that I, ROSWELL H. BUCKINGHAM, a citizen of the United States, residing at East Moline, in the county of Rock Island and State of Illinois, have invented a new and useful Cattle-Stanchion, of which the following is a specification.

My invention relates to improvements in cattle stanchions in which the parts are adjustable, and the object of my invention is to provide a stanchion which may be quickly and easily adjusted to fit the neck of the animal by which it is confined or haltered. I attain this object by the mechanism illustrated in the accompanying drawings, in which—

Figure 4:
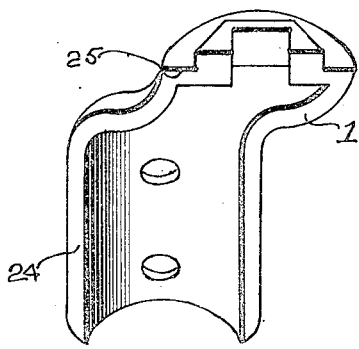
Figure 5:
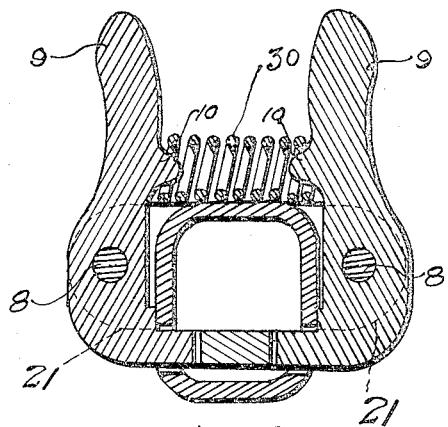
Figure 6:
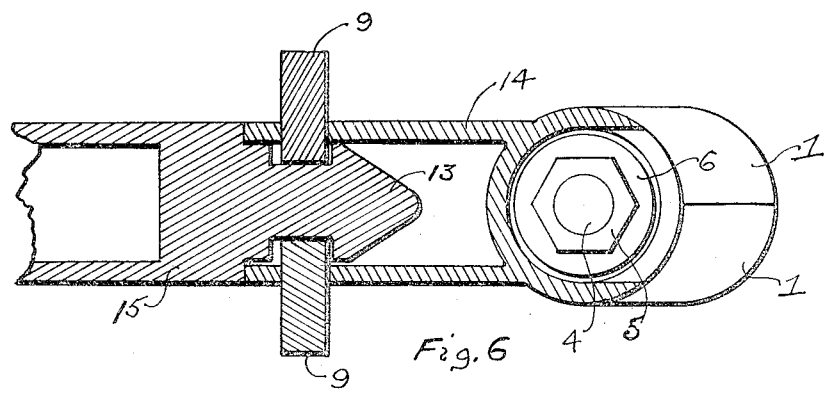
Figure 7:
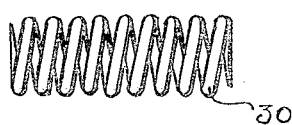
Figure 8:
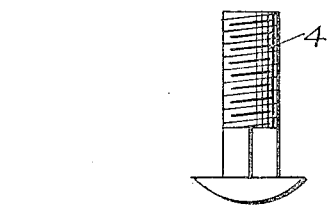

Figure 1 represents a side view of my improved stanchion, a portion of which is a section along the line C—D of Fig. 2. Fig. 2 is a section along the line A—B of Fig. 1, with the side members in such position that the space between them is reduced to its narrowest limits, and the stanchion closed. Fig. 3 is also a section along the line A B of Fig. 1, with the side members in such position that the space between them is extended to its widest limits, and with the stanchion partially opened. Fig. 4 is a view of one of the pair of clips 1—1 in Fig. 2. Fig. 5 is a sectional view of the locking device, along the line E F of Fig. 2. Fig. 6 is a sectional view of the locking device along the line G H of Fig. 2. Fig. 7 is a side view of the spring 30. Fig. 8 is a side view of the carriage bolt 4 of Fig. 2.

Similar numbers refer to similar parts in all views.

Referring to Fig. 2, 1 is one of a pair of mating clips provided with a flat portion 25 at one end and a half cylindrical portion 24. The portion 24 when mated with its fellow is adapted to embrace the end of the pipe 2 and the two are riveted firmly to said pipe 2 by means of the rivets 3—3. The flat end portions of the clips 1—1 are semi-circular in form and are provided with semi-hexagonal projections and have half square openings extending through the flat end portions and the semi-hexagonal projections, the parts being so disposed, as shown in Fig. 4, that when the clips are riveted to pipes 2—2, the flat end portions form a completely circular surface, with a complete hexagonal projection and a complete square hole, all of which are concentric.

The parts 27 and 28 are similar members of a hinge, the parts hollowed out as shown in Figs. 2 and 3. The parts 14 and 15 are hollow locking members, and the free end of each of the members 27—28—14 and 15 is provided with a hexagonal hole through which the hexagonal projection formed by the pair of clips 1—1 may enter and engage therewith.

The bolt 4 is what is commercially known as a carriage bolt and is provided with a head, of which one side is oval and the opposite side flat, a square portion of the body of the bolt being adjacent to the flat surface of the head, and a cylindrical threaded portion of the body adjacent to and extending beyond the square portion as shown in Fig. 8. The square hole formed by the mating of the two clips 1—1 is adapted to surround and engage with the square portion of the bolt 4 and prevent its rotation in said hole. The bolt 4 is introduced between the mating clips 1—1 prior to their being riveted to the pipes 2—2.

The circular flat surface of the clips 1—1, the hexagonal projection, and the square hole are so disposed with relation to the cylindrical portions 24—24 that the longitudinal axis of the bolt, when introduced between the clips, is not concentric with the longitudinal axis of the pipe 2, which is surrounded by the cylindrical portions of the clips, but is offset or eccentric therefrom, the amount of offset or eccentricity determining the limits of adjustability of the pipes 2—2.

Referring again to Fig. 2, 6 is a washer surrounding the bolt 4, said washer being larger in diameter than the hexagonal hole in the end of the member 14. 5 is a nut adapted to screw on the threaded portion of the bolt 4 and draw the hexagonal projection formed by the clips 1—1 into the hexagonal hole in the end of the member 14 until the flat semi-circular ends of the clips are brought into contact with the end of the member 14, thus binding the parts firmly together, the engagement of the hexagonal projection and the hexagonal hole preventing the rotation of the clips 1—1 and the pipe 2 about the axis of the bolt 4. It is evident, however, that when it is desired to make a change in the position of the pipe 2, it is only necessary to slacken the nut 5 on the bolt 4, until the hexagonal projection may be withdrawn from the hexagonal hole, when the clips 1—1 together with the pipe 2, may be rotated partially or entirely as may be desired, and the hexagonal projection drawn into engagement with the hexagonal hole in their new relation by tightening the nut 5 on the bolt 4. I do not wish to confine myself to this construction and method of preventing rotation of the pipe 2 about an eccentric axis, as other means may be employed without departing from the spirit of my invention.

As shown in Fig. 2, the same construction and action is applied to each end of the pipes 2—2 and the free end of each of the members 14—15—27—28.

Cylindrical wooden bars may be used in place of tubes or pipes for 2—2.

The lugs 12—12 are integral with the member 15 and each lug has a hole 16. These lugs are used in conjunction with any suitable means for suspending the stanchion at a convenient height. The members 27 and 28 are hinged together by means of a rivet or bolt as 29 in Fig. 2. The member 15 is also provided with the tongue 13 as shown in Fig. 3 and Fig. 6. This tongue has an arrow shaped end as in Fig. 6 and two indentations on opposite sides also shown in Fig. 6.

The member 14 is provided with two pairs of lugs 21—21 provided with holes through which the rivets 8—8 may pass. 9—9 in Fig. 1 and Fig. 5 are two fingers, of such thickness that they may be placed between the lugs 21—21 and each provided with a hole through which the rivet 8 may pass, the fingers being adapted to turn easily on the rivets. Each finger 9 is also provided with a conical projection 10 shown in Figs. 1 and 5.

30 is a spiral spring as shown in section in Fig. 5 and in detail in Fig. 7. This spring it is still in a state of compression and tends over the conical projections 10 as in Fig. 5 it is still in a state of compression and tends to spread the upper ends of the fingers apart until such action is stopped by the sides of the fingers 9 on the opposite sides of the rivets 8—8 coming in contact with the sides of the hollow member 14. The spring is not shown in Fig. 2, it being omitted to clarify the drawing. The member 14 is also provided with two openings through which the lower ends of the fingers may pass, as in Fig. 5.

The action of locking the stanchion is as follows:—Pressure is applied to the pipes 2—2 to bring them nearer to each other and as the members 14 and 15 approach each other, being guided into proper position by the hinge formed of the members 27 and 28, the arrow shaped tongue 13 enters between the lower ends of the fingers 9, forcing them apart and compressing the spring 30. When the tongue 13 has penetrated the end of the hollow member 14 to a sufficient extent, the lower ends of the fingers 9 enter into and engage with the indentations in the sides of the tongue 13, and are held in such engagement through the action of the spring 30. The stanchion is then securely locked until pressure is applied to the upper ends of the fingers 9 simultaneously, when the lower ends will be disengaged from the indentations in the tongue 13, allowing it to pass out between the fingers, and the stanchion to be opened.

What I claim and desire to secure by Letters Patent is:—

1. In a cattle stanchion, the combination of end and side members, at least one of said members having pivotal connection at its ends with said end members, the axis of rotation of said side member being laterally offset from the longitudinal axis of said side member.

2. In a cattle stanchion, the combination of end and side members, said side members having pivotal connection at their ends with said end members, said points of pivotal connection being offset laterally from said side members to permit the same to be rotated about axes disposed laterally from the longitudinal axes of said side members.

3. In a cattle stanchion, the combination of end and side members, at least one of said side members being provided with laterally offset end portions having pivotal connection with said end members to permit rotative movement of said side member about an axis offset from the longitudinal axis of said side member.

4. In a cattle stanchion, the combination of end members and side members, and means for pivotally connecting at least one of said side members with said end members, said means being laterally offset from the longitudinal axis of said side member.

5. In a cattle stanchion, the combination of end and side members, at least one of said side members being pivotally connected at its ends to said end members, said points of pivotal connection being offset from said side member to permit the same to be rotatively adjusted about an axis laterally offset from the longitudinal axis of said side member, and means for securing said side member in its adjusted position.

6. In a cattle stanchion, the combination of hinged end members at one end and detachable end members at the other end of said stanchion, cylindric side members intermediate said end members, and means for pivotally connecting the ends of at least one of said side members to the adjacent end members, said means being laterally offset from the longitudinal axis of said side member.

7. In a cattle stanchion, the combination of hinged end members at one end and detachable end members at the other end of said stanchion, side members intermediate said end members, means for pivotally connecting the ends of at least one of said side members to the adjacent end members, said means being laterally offset from the longitudinal axis of said side member to permit rotative adjustment thereof, and means for securing said side member in adjusted position against rotation.

8. In a cattle stanchion, in combination with locking end members and hinged end members, two cylindrical side members rotatably attached to said end members, the axis of each of said side members being eccentric to the axis about which it rotates, and means for holding said side members in adjusted position against rotation.

ROSWELL H. BUCKINGHAM.

Witnesses:
W. J. TAZE,
E. H. BILTER.

Copies of this patent may be obtained for five cents each, by addressing the "Commissioner of Patents, Washington, D. C."